Jan. 23, 1968 AKIO MATSUMOTO ETAL 3,365,679

IMAGE LINEAR PHASE FILTER

Filed July 29, 1963 4 Sheets-Sheet 1

IMAGE LINEAR PHASE FILTER

Filed July 29, 1963 4 Sheets-Sheet 2

Jan. 23, 1968 AKIO MATSUMOTO ETAL 3,365,679

IMAGE LINEAR PHASE FILTER

Filed July 29, 1963 4 Sheets-Sheet 4

United States Patent Office 3,365,679

Patented Jan. 23, 1968

3,365,679

IMAGE LINEAR PHASE FILTER

Akio Matsumoto, Sapporo-shi, and Kinya Toyama, Yokohama-shi, Japan, assignors to Toyo Tsushinki Kabushiki Kaisha, Kawasaki-shi, Japan, a joint-stock company of Japan Filed July 29, 1963, Ser. No. 298,148
1 Claim. (Cl. 333—28)

This invention relates to an image linear phase filter and more particularly to a filter having a linear image phase characteristic suitable for operation at high frequencies.

With the advance of the telephone art, distortions caused by transmission lines have been decreased gradually and it has become necessary to transmit wide band frequencies as in the case of wave transmissions such as program transmission or telephone code transmission over long distance. Moreover, circuit components, particularly filters used in the transmission systems as described above are required to have characteristics such that the phase shift in the pass band varies linearly with respect to the frequency without any accompanying appreciable phase distortion in addition to the requirement of providing large attenuation in their attenuation band as in the case of conventional filters. However, as is well known in the art, the filter having a small phase distortion in the pass band is not satisfactory in the attenuation band where the amount of attenuation should become infinity at finite real frequencies, and accompanies with an attenuation being in proportion to the square of the frequency, whereby the characteristic of said filter becomes the so-called Gauss characteristic and attenuation in the attenuation zone will be extremely sacrificed.

Accordingly, the filters having a required degree of attenuation and having a linear phase characteristic of the pass band with respect to the frequency were not practical because they necessitate a number of elements of high quality. Therefore, the filters as described above, must be designed so as to minimize the number of elements by taking in consideration what percentage of the deviation between their phase characteristics of the pass band and the reference characteristic may be allowable while providing a required degree of attenuation.

One method of constructing such new filter having a small phase distortion is fully disclosed in the Japanese patent application No. 4,449/1959, now Patent No. 313,956, of the title "Filters Having Small Delay Distortions."

In the Japanese patent it is disclosed that, in order to afford a linear phase characteristic to a certain reactance network in a given frequency range, frequencies whose phase angles in said frequency range correspond to multiples of 90°

$$(\pi/2)$$

must be perfectly on a straight line. Spectral parameters are defined with regard to emittances (short circuit, open circuit) which are specific to said reactance network and having poles and zero points, which are alternately arranged at equidistant positions. It is described that the spectral parameter has a particular relation to the phase characteristic of said network and that a specified delay time is included in an envelope of a specified spectral function, so that linearization of the phase characteristic can be attained by flattening the spectral function.

This invention relates to linearization of the phase characteristic in the pass band of an image parameter filter (hereinafter will be merely designated as "filter") in which the image transmission constant (hereinafter will be designated as "transmission constant") of a four terminal reactance network is represented as an irrational reactance function and, more particularly to a phase linear filter which is designed to introduce a so-called spectral function which is obtained by multiplying tan $\beta$ and cot $\beta$, which are respectively, tangent function and cotangent function of the image phase angle $\beta$ represented as an irrational function having equally spaced particular points with respect to the frequency in a pass band but excluding the cut off frequency of the filter and nearby frequencies, by tangent or cotangent function of a triangle having particular inverted points (zero points or poles) of equal spacings, whereby the function is brought closer to a fixed value in the pass band.

Accordingly, it is the principal object of this invention to provide a filter which has a linear characteristic and can attain stable operation in a high frequency band.

Another object of this invention is to provide a phase linear filter having a wide transmission band and suitable for use in a frequency modulated communication device.

Still another object of this invention is to provide a filter which enables the manufacture of a carrier wave telegraph apparatus operating in a frequency band which cannot be attained by the conventional filters.

Still another object of this invention is to provide a novel method of linearizing the phase characteristic of a filter.

The details of the invention as well as the manner in which the foregoing objects and advantages of the present invention may be best achieved will be more clearly apparent by reference to the following description of representative embodiments of the invention when taken in connection with the accompanying drawings, in which.

Figure 6A:
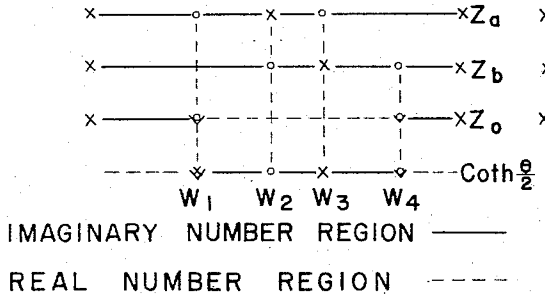
Figure 6B:
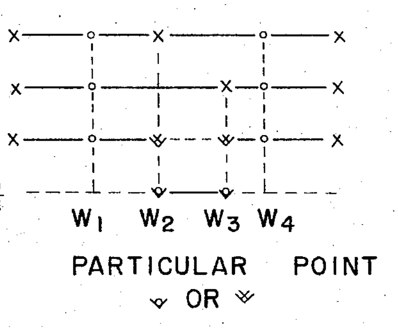
Figure 6C:
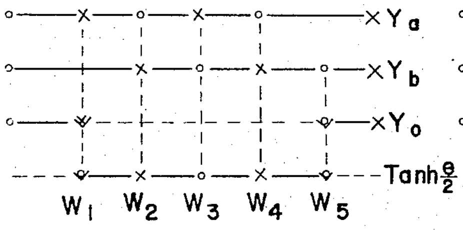
Figure 6D:
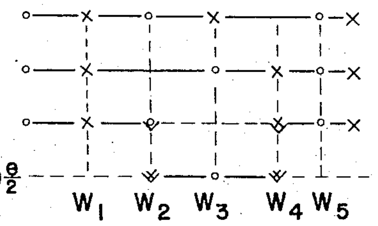
Figure 7A:
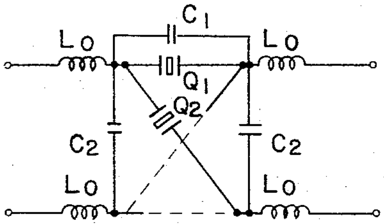
Figure 7B:
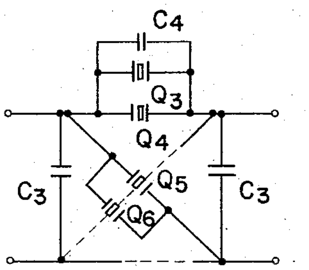
Figure 8:
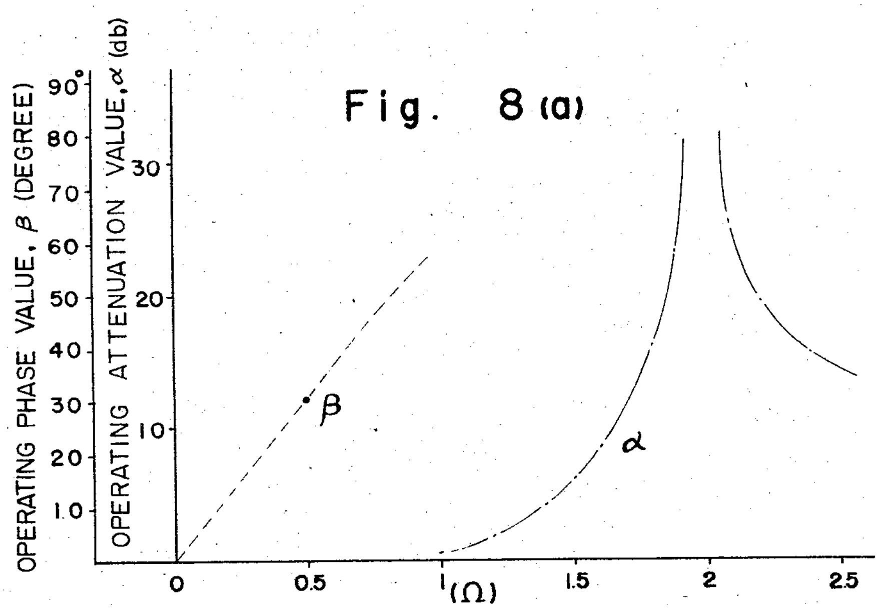
Figure 8:
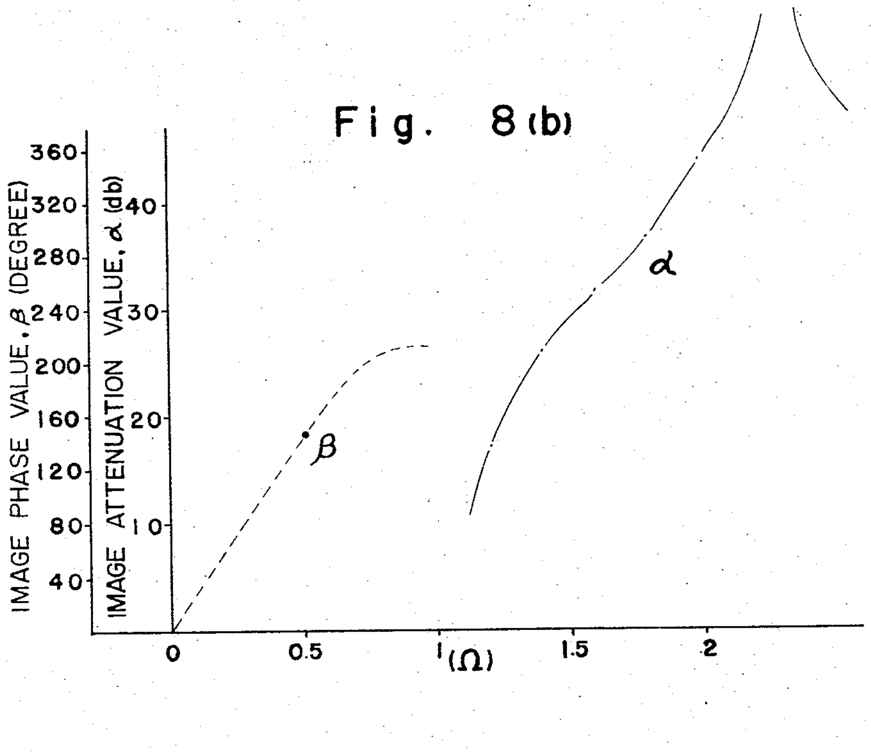

FIG. 6 is a diagram illustrating the manner of transferring orders 3 and 4 among the even and odd orders of an image transmitting constant composed by a lattice type circuit to orders 1 and 2, respectively, by providing special points for the image impedance (or image admittance), wherein FIG. 6*a* and FIG. 6*c* show the orders 3 and 4 and FIG. 6*b* and FIG. 6*d* show the orders 1 and 2, respectively;

FIG. 7*a* and 7*b* are schematics of image linear phase filters which are constructed by using lattice type circuits including a quartz resonance element, wherein FIG. 7*a* shows a broad band quartz filter and FIG. 7*b* a narrow band quartz filter; and FIGS. 8*a* and 8*b* are diagrams which illustrate an example of the phase characteristic and the attenuation characteristic of the quartz filters shown in FIGS. 7*a* and 7*b* wherein FIG. 8*a* shows the operation attenuation characteristic and the operation phase characteristic of the filter shown in FIG. 7*a*, and FIG. 8*b* the image attenuation characteristic and the image phase characteristic of the filter shown in FIG. 7b.

As is well known in the art, the image transmission constant is represented by the following equation when the constant is expressed by the terms of $Z_{11}$ and $Y_{11}$ in the impedance and the admittance matrices of a four terminal reactance network.

$$\coth\theta'=\sqrt{Z_{11},\ Y_{11}}=\frac{1}{\sqrt{Y_{1f}Z_{is}}}$$

$Z_{is}$ and $Y_{1f}$ in the said equation represent, respectively, the short circuit impedance and the open circuit admittance of the network and are given as two terminal reactance networks, so that the transmission constant $\theta'$ representing their geometric mean becomes an irrational function. Considering now the variation of this transmission constant, it can be pointed out that, in the pass band, $\coth\theta'$ (or $\tanh\theta'$) is an imaginary number while the image attenuation constant is zero, that the image phase constant will increase as a monotone quantity as the frequency increases as a monotone quantity, that the poles (zero points) and the zero points (poles) of $\coth\theta'$ (or $\tanh\theta'$) exist alternately and have values of plus or minus even multiples of $\pi/2$ at poles (zero points) and of plus or minus odd multiples of $\pi/2$ at zero points (poles).

In order to assure this image parameter filter to be free from any phase distortion in the pass band outside the neighborhood of the cut-off frequency the particular points in the imaginary region of $\coth\theta'$ (or $\tanh\theta'$) should be equally spaced with respect to the frequency and the angle of the image phase (hereinafter, will be called phase angle, for brevity) at these points should be multiples of $\pi/2$. Therefore, the irrational functions of such image parameters are converted to the phase angle $\beta$ of the standardized reference low pass filter type and represented as follows according to whether the order is even or odd one.

For even orders $2n$, $$\tan\beta_{2n}=\frac{\pi}{2}\Omega\frac{\left(1-\frac{1}{4}\Omega^2\right)\left(1-\frac{1}{16}\Omega^2\right)\cdots\sqrt{1-k\frac{\Omega^2}{n^2}}}{(1\Omega^2)\left(1-\frac{1}{9}\Omega^2\right)\cdots 1-\frac{\Omega^2}{(n-1)^2}} \qquad (1)$$

For odd orders $2m+1$, $$\tan\beta_{2m}+1=\frac{(\Omega+a_1)(\Omega-a_2)(\Omega+a_3)\cdots(\Omega\pm am)\sqrt{\Omega\mp 1}}{(\Omega-a_1)(\Omega+a_2)(\Omega-a_3)\ldots(\Omega\mp am)\sqrt{\Omega\pm 1}} \qquad (2)$$

where $\Omega$ represents the standardized frequency and $\Omega=\pm1$ the cut-off frequency, $n$ represents 1, 2, 3 . . . and $m$ represents 0, 1, 2, 3 . . . . Representation of the Equation 1 for the even order $n$ has the same form as the reactance function with respect to the standardized frequency $\Omega$ excepting the factor with a square root. Thus, it is clear that the image phase characteristic (for brevity, hereinafter called "phase characteristic") can be easily linearized by introducing the spectral parameter.

Accordingly, the function becomes a continuous function with respect to $\Omega$ within the pass band ($\Omega<1$) by equally spacing the special points of $\Omega$ as represented by the Equation 1 excepting factors with square roots which have the most significant influence upon the portion of the characteristic near the cut-off frequency, and by giving the spectral function $(T_{2n})_{sp}$ by the following Equations 3 and 4.

$$(T_{2n})_{sp}=(\tan\beta_{2n})\cdot\cot\frac{\pi}{2}\Omega \qquad (3)$$

or $$(\cot\beta_{2n})\ \tan\frac{\pi}{2}\Omega \qquad (4)$$

Furthermore, the delay characteristic given by the slope of the phase characteristic will be included in the characteristic curves with an envelope represented by the Equation 3 or 4.

By varying the parameter $k$ included in the root sign (Equation 1) the factor with a square root can improve spectral alignment (asymptoting towards 1 of the spectral function) of the Equation 3 or 4 for linearizing the phase characteristic.

Figure 1:
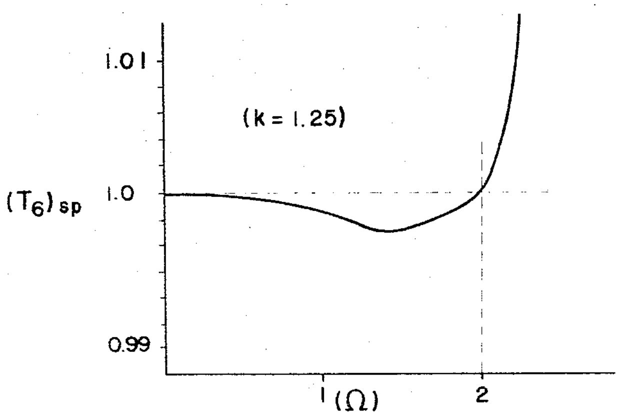
FIG. 1 is a diagram of a spectral function characteristic curve of an even order where $2n=6$.

FIG. 1 illustrates the characteristic of the spectral function where $2n=6$ and $k$ is selected to be equal 1.25, so that alignment $(T_6)_{sp}=1$ is obtained at $\Omega-2$.

Thus, this invention is characterized in that the phase characteristic of a filter can be easily linearized by utilizing a spectral parameter regardless how high the order of the Equation 1 may be (i.e. how large $n$ may be). Differing from the case of even orders ($2n$), since the odd orders ($2n+1$) are expressed by a product of a first order factor with respect to the standardized frequency $\Omega$, it is not possible to linearize the phase characteristic by mere equal spacing of the special points. This standardized frequency corresponds to a predetermined standard frequency adapted to a filter to be designed.

Figure 2:
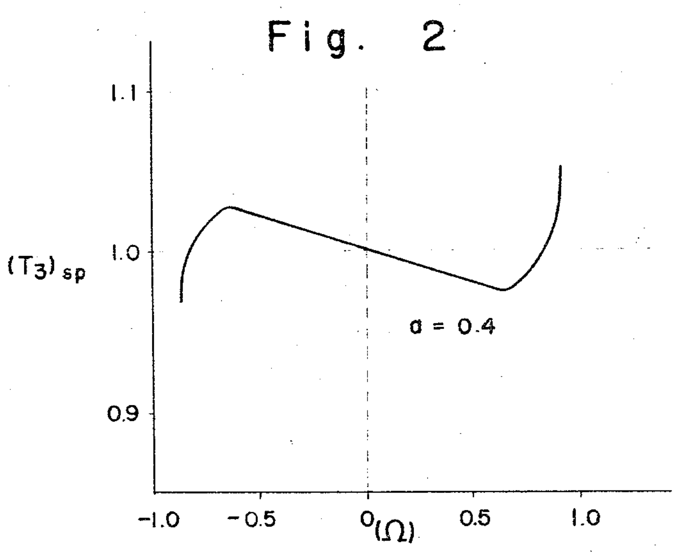
FIG. 2 is a diagram of a spectral function characteristic curve of an odd order where $2n+1=3$.

However, when an equation of the order 3 is taken as the example, it becomes easy to construct a filter having a linear phase characteristic as shown in FIG. 2 or a filter wherein the deviation from the reference value of the spectral function is small by varying a new parameter as a continuous function by utilizing a spectral function represented by $$(T_3)_{sp}=\frac{(\Omega-a)\sqrt{\Omega+1}}{(\Omega+a)\sqrt{\Omega-1}}\cot\frac{\pi(\Omega-a)}{4a} \qquad (5)$$

which is derived from Equation 2.

For higher odd orders, it is possible to construct a linear phase filter of higher odd orders by taking an even order of high order and combining it with an odd order of lower order because the transmission constant can be decomposed into even and odd order functions by the image parameter method.

While in the foregoing it has been stated that the feature of this invention resides in linearizing the phase characteristic within the pass band by introducing the spectral parameter, it should be understood that the amount of attenuation in the attenuation region is one of the important factors of the filter so that presence of attenuation poles in the actual frequency in the attenuation region is preferable for the characteristic of the filter.

However, in this method of linearizing the phase characteristic by means of a spectral parameter the attenuation pole may not be present in the actual frequency.

Accordingly more elements are required than the conventional filters in order to meet a required specification for attenuation.

For this reason, to construct a filter having a linear phase characteristic in the pass band and yet providing maximum attenuation in the attenuation band by utilizing minimum number of elements, it is necessary to expand the prior derived M type transformation. Furthermore, the characteristic feature of this invention resides in constructing a novel filter having a linear phase characteristic in the pass band and yet having a maximum amount of attenuation in the attenuation zone for selecting a value larger than 1 or even a complex number as the value of the parameter $m$ in the derived M type transformation.

Figure 3:
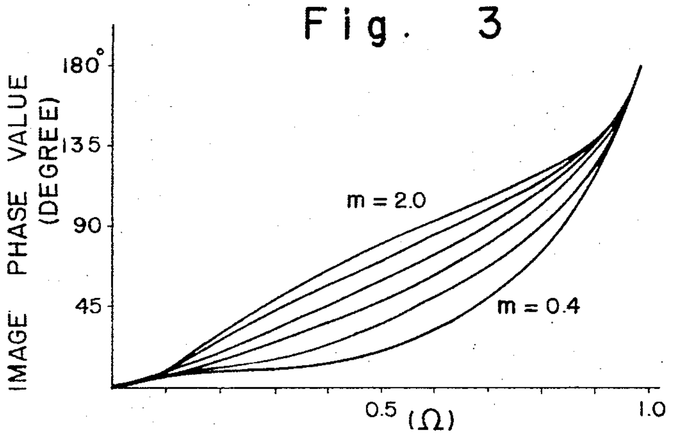
FIG. 3 is a diagram illustrating image phase characteristics wherein the parameter $m$ is changed variously.
Figure 4:
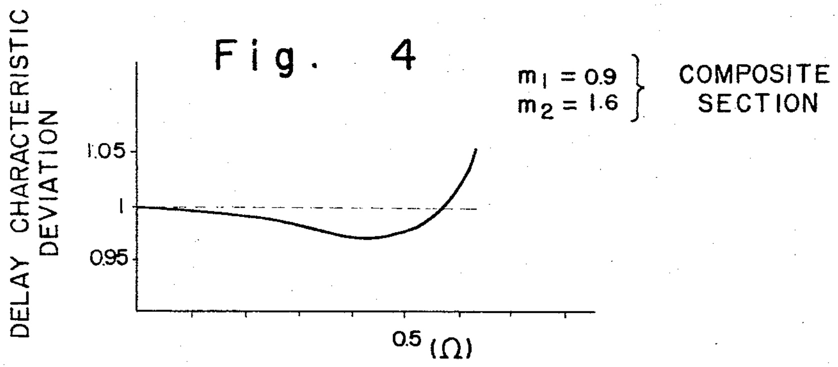
FIG. 4 is a diagram of a delay characteristic curve of a composite section wherein the parameter $m$ is made to be equal to 0.9 and 1.6.

As is well recognized in the art the parameter $m$ should be less than 1 in order to provide attenuating poles for the actual frequency, but in this case, the phase characteristic become more concave as the parameter $m$ decreases, i.e. departs from a straight line, as shown in FIG. 3. Thus, in order to linearize the phase characteristics of such a filter having attenuation poles it is necessary to connect in series therewith an additional section having the same image impedance characteristic as the filter having such attenuation poles, but having the opposite phase characteristic so as to provide a combined linear phase characteristic. The condition required for the parameter *m* for effecting derived M transformation to provide convex phase characteristics is to make *m* larger than 1 as can be seen from FIG. 3, FIG. 4 shows a delay characteristic of composite sections having the values of *m* 0.9 and 1.6 in which the delay distortion is kept within 3% over a frequency range $\Omega=0\sim0.6$.

As will be obvious from FIG. 3, linearization of the phase characteristic when sections of a small parameter *m* (which provides a steep attenuation characteristic) are used is not satisfactory so far as the parameter *m* is a real number. Moreover the number of sections used must be increased.

Figure 5:
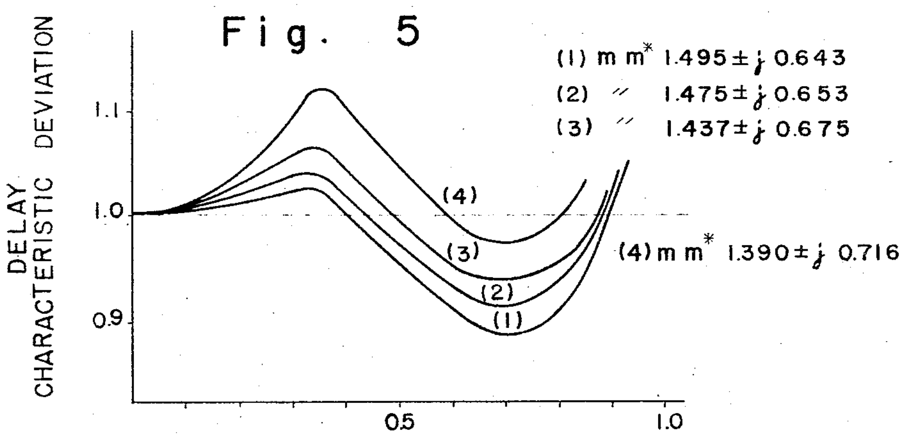
FIG. 5 is a diagram of curves illustrating delay characteristics wherein the parameter $m$ has various values of a complex number.

This invention is characterized by using a complex number for the value of the parameter *m*, whereby the degree of freedom of the parameter is increased, the phase characteristics are made to be varied, and the phase characteristic can be made to be linearized even for the requirement to obtain a steep attenuation characteristic. In FIG. 5 are shown deviations of the delay characteristics when the value of the parameter *m* is varied, wherein $m^*$ represent conjugate complex numbers of *m*. It is seen that sections having the value of *m* shown by numerals (1), (2), etc., of the figure are effective to provide linear phase characteristics each having a steep attenuation characteristic.

By employing such parameters, it becomes possible to make the deviation from the reference value of the delay characteristic to be the maximum flatness type or Chebyshev type within the desired frequency range.

Since filters having linear phase characteristic fully described hereinbefore are not networks of minimum phase, their physical circuit construction can be realized only with a lattice type circuit or bridged T type, parallel T type or other equivalent circuits and can not be realized with the ladder type circuit of positive elements.

This invention is further characterized by constructing a filter by obtaining attenuation poles due to reflection from terminating resistances at special points of the image impedance, compensating the operation attenuation distortion in the pass band while at the same time linearizing the operating phase characteristic. It should be understood, that, in this invention, attenuation poles of linear phase filters realized in the lattice type circuit cannot be obtained by making a value of the parameter *m* less than 1.

More particularly, by suitably arranging, for example as shown in FIGS. 6*b* and 6*d*, the particular points of the impedances $Z_a$ and $Z_b$ (or admittances $Y_a$ and $Y_b$) between two terminals of each arm of a lattice type circuit it is possible to form particular points of the image impedance Z (or image admittance Y) in the attenuation band and to provide attenuation poles due to reflection between said points and the operating effective resistances (1Ω) by utilizing the relation represented by the following Equation 6.

$$\text{Reflection loss}=20\log 10\left|\frac{1Z_0}{2\sqrt{Z_0}}\right|=20\log 10\left|\frac{1Y_0}{2\sqrt{Y_0}}\right|\text{(db)} \quad (6)$$

where $Z_0$ and $Y_0$ are the image impedance and the image admittance, respectively. From this equation it is clear that the reflection loss becomes infinity at the zero points and poles of $Z_0$ or $Y_0$. Thus, since the image impedance $Z_0$ (or admittance $Y_0$) having particular points are derived M type in the pass band, when the phase characteristic is previously converted to a linear characteristic, it is possible to improve attenuation distortion without deteriorating the phase characteristic, as compared with the case of constant *k* type image impedances. FIG. 6*a* shows an image parameter $$\coth\frac{\theta}{2}$$

of odd order 3 with cutoff frequencies at $\omega_1$ and $\omega_4$, and FIG. 6*b* is its transformation into one of order 1 having cutoff frequencies at $\omega_2$ and $\omega_3$, and having particular points (zero points) of $Z_0$ at $\omega_1$ and $\omega_4$. FIG. 6*c* shows an image parameter $$\coth\frac{\theta}{2}$$

of even order 4 with cutoff frequencies at $\omega_1$ and $\omega_5$, and FIG. 6*d* is its transformation into one of order 2 having cutoff frequencies at $\omega_2$ and $\omega_4$, and having particular points (poles) of $Z_0$ at $\omega_2$ and $\omega_4$. Admittance $Y_0$ in FIG. 6*d* is ° at $\omega_2$ and $^{x}$ at $\omega_4$.

In compounding such filters, the respective sections must be connected in cascade through appropriate resistance attenuators because the attenuation poles are due to reflection between the operating effective resistance and the image impedance (admittance).

The linear phase filters of the lattice type embodying the principle of this invention can be constructed by using quartz filters.

Thus each of the image parameters of order 3 and 4 illustrated in FIGS. 6*a*, 6*b*, 6*c* and 6*d* can be constructed as a quartz filter. Image parameters shown in FIGS. 6*a* and 6*b* are constructed by a broad band quartz filter shown in FIG. 7*a* and comprising quartz resonance elements $Q_1$ and $Q_2$, coils $L_0$ and condensers $C_1$ and $C_2$ while those shown in FIGS. 6*c* and 6*d* are constructed by a narrow band quartz filter shown in FIG. 7*b* and comprising quartz resonance element $Q_3$ to $Q_6$ inclusive and condensers $C_3$ and $C_4$. It will be clear that the order of the filter can be raised so as to improve the attenuation characteristic and to further linearize the phase characteristic by increasing the number of quartz resonance elements included in each section by connecting one or more additional quartz resonance element in parallel with the quartz resonance elements shown in FIGS. 7*a* and 7*b*, or by connecting in series the sections shown in FIGS. 7*a* and 7*b* with their image impedances matched. For example, in FIG. 8*a* are shown the operating phase characteristic and the operating attenuation characteristic of a linear phase filter constructed by a broad band crystal filter wherein the particular points Ω of the image impedance of FIG. 6 were selected to 2. FIG. 8*a* shows that the phase characteristic retains its linearity up to $\Omega=0.6$. In FIG. 8*b* are shown the image phase characteristic and the image attenuation characteristic of a linear phase filter having a delay characteristic as shown in FIG. 4 and constructed by serially connecting a number of sections with their values of parameter *m* selected to be 0.9 and 1.6 by referring to FIG. 6*c*.

By utilizing stable quartz resonance elements it becomes possible to construct linear phase filters which can operate stably in a high frequency band (for example, near 1000 kc. of near 10 mc.) which makes easy to manufacture carrier wave telegraph apparatus operable in such a high frequency band that could not be attained before and to construct linear phase filters of broad transmission band suitable for use in FM devices.

While the invention has been explained by describing particular embodiments thereof, it will be apparent that improvements and modifications may be made without departing from the scope of the invention as defined in the appended claim.

What is claimed is:

1. A method of manufacturing an image phase linear filter comprising, making a network of sections in which spectral functions $(T_{2n})_{sp}$ and $(T_{2m+1})_{sp}$ represented by representative functions equal to a selected standardized value representative of terminal motion resistance of the filter at particular points of a standardized angular frequency $\Omega$ which are alternately positioned at equal intervals and in which said representative functions comprise for an even order $$(T_{2n})_{sp}=\tan\frac{\beta_{2n}}{2}\cdot\cot\frac{\pi}{2}\Omega$$

$$=\frac{\pi}{2}\cdot\frac{\Omega(1-\frac{1}{4}\Omega^2)(1-\frac{1}{16}\Omega^2)\ \ldots\ 1-k\frac{\Omega^2}{n^2}}{(1-\Omega^2)(1-\frac{1}{9}\Omega^2)\ \ldots\ \left(1-\frac{\Omega^2}{(n-1)^2}\right)}\cdot\cot\frac{\pi}{2}\Omega$$

and for odd order $$(T_{2m+1})_{sp}=\tan\frac{\beta_{2m+1}}{2}\cdot\cot\frac{\pi(\Omega-a)}{4a}$$

$$=\frac{(\Omega+a)(\Omega-3a)\ \ldots\ [\Omega\pm(2m+1)a]}{(\Omega-a)(\Omega+3a)\ \ldots\ [\Omega\mp(2m-1)a]}\cdot\cot\frac{\pi(\Omega-a)}{4a}$$

to linearize the frequency characteristics of even and odd order image phase quantities represented by irrational reactance functions in which the short-circuit admittance of a no loss uniform line has a multiple factor of $\pi/2$ and said particular points are positioned at equal intervals; and selecting the parameters $k$ and $a$ of said equations according to the same method as the approximate matching of admittance in conventional filter theory, so that said sections as represented by said functions $(T_{2n})_{sp}$ and $(T_{2m+1})_{sp}$ are approximately matched with 1 within a given frequency range, and said selection being caused by the fact that the deviation of image delay characteristics between said particular points is equal to the deviation from the standardized values of said spectral functions.

References Cited

UNITED STATES PATENTS 3,122,716 2/1964 Whang ------------- 333—28

ELI LIEBERMAN, *Primary Examiner.*